United States Patent
Pei et al.

(10) Patent No.: US 12,192,799 B2
(45) Date of Patent: Jan. 7, 2025

(54) AUTONOMOUS ACCESS POINT FAILURE RECOVERY

(71) Applicant: Hewlett Packard Enterprise Development LP, Houston, TX (US)

(72) Inventors: Junyu Pei, Beijing (CN); Xiaohang Wei, Beijing (CN); Pengfei Jin, Beijing (CN); Xiaoyang Fu, Beijing (CN); Kangchang Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 17/494,881

(22) Filed: Oct. 6, 2021

(65) Prior Publication Data

US 2023/0125405 A1    Apr. 27, 2023

(51) Int. Cl.
| | |
|---|---|
| *H04W 24/04* | (2009.01) |
| *H04L 41/0654* | (2022.01) |
| *H04W 48/16* | (2009.01) |
| *H04W 72/20* | (2023.01) |
| *H04W 76/14* | (2018.01) |
| *H04W 76/18* | (2018.01) |

(52) U.S. Cl.
CPC ......... *H04W 24/04* (2013.01); *H04L 41/0654* (2013.01); *H04W 48/16* (2013.01); *H04W 72/20* (2023.01); *H04W 76/14* (2018.02); *H04W 76/18* (2018.02)

(58) Field of Classification Search
None
See application file for complete search history.

(56) References Cited

U.S. PATENT DOCUMENTS

| | | | |
|---|---|---|---|
| 7,178,059 B2 | 2/2007 | Greenspan et al. |
| 7,463,654 B2 | 12/2008 | Riegel et al. |
| 7,890,794 B1 | 2/2011 | Gasser |
| 7,958,271 B2 | 6/2011 | Zou et al. |
| 8,769,293 B2 | 7/2014 | Vlachos et al. |
| 8,885,539 B2 | 11/2014 | Trudeau et al. |
| 9,563,683 B2 | 2/2017 | Abercrombie et al. |
| 9,565,085 B2 | 2/2017 | Balachandran et al. |
| 9,826,571 B2 | 11/2017 | Iyer et al. |
| 10,102,073 B2 | 10/2018 | Swierk et al. |
| 10,219,245 B2 | 2/2019 | Prasad et al. |

(Continued)

FOREIGN PATENT DOCUMENTS

| | | | |
|---|---|---|---|
| CN | 102333335 A | * | 1/2012 |
| WO | WO-20200023410 | | 1/2020 |

*Primary Examiner* — Pamit Kaur
(74) *Attorney, Agent, or Firm* — Hewlett Packard Enterprise Patent Department

(57) ABSTRACT

Implementations of the present disclosure relate to automatic AP failure recovery with assistance of a neighbor AP. A method includes detecting, by a first access point (AP), a failure at the first AP. The method further includes transmitting, by the first AP to a second AP, a query about an operating status of the second AP. The first AP then receives, from the second AP, a response to the query, the response indicating the operating status of the second AP. The method also includes determining, by the first AP and based at least in part on the operating status of the second AP, that the failure is not indicative of an event also impacting the second AP. The method further includes utilizing, by the first AP, the second AP to assist with recovery from the failure.

16 Claims, 10 Drawing Sheets

(56) References Cited

U.S. PATENT DOCUMENTS

| | | | |
|---|---|---|---|
| 11,196,618 B1* | 12/2021 | Butler | H04W 8/02 |
| 2004/0249831 A1 | 12/2004 | Fagin et al. | |
| 2006/0062154 A1* | 3/2006 | Choy | H04W 28/14 |
| | | | 370/242 |
| 2006/0190587 A1 | 8/2006 | Sylvest et al. | |
| 2007/0171844 A1* | 7/2007 | Loyd | H04L 41/12 |
| | | | 370/254 |
| 2008/0133496 A1 | 6/2008 | Kanungo et al. | |
| 2009/0019137 A1 | 1/2009 | Mishra et al. | |
| 2009/0213730 A1* | 8/2009 | Zeng | H04W 24/04 |
| | | | 370/217 |
| 2018/0183653 A1 | 6/2018 | Chew et al. | |
| 2018/0302807 A1 | 10/2018 | Chen et al. | |
| 2020/0245212 A1 | 7/2020 | Jia et al. | |
| 2020/0252855 A1 | 8/2020 | Polacheck | |

\* cited by examiner

AUTONOMOUS ACCESS POINT FAILURE RECOVERY

BACKGROUND

Network deployments often include a large number of access points (APs) deployed in a distributed manner to provide a large coverage area for wireless networking services provided by the deployment. The APs are usually connected to one or more access controllers (ACs) that provide control and management functions for the deployed APs. The deployed APs are registered with the ACs, and as a result, an AP may be aware of other APs connected to the same AC nearby, referred to as neighbor APs. An AP may communicate with its neighbor APs wirelessly.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

A coverage range of a deployment of APs can be extensive. When a failure occurs at one of the APs, an AC associated with the failed AP may detect disconnection of the failed AP. However, while the AC determines that a failure has occurred at an AP based on the detected disconnection, the AC cannot determine which AP failed or where the failed AP is located within the deployment. In particular, it is generally difficult to locate a failed AP in a broad deployment. Moreover, the cause of the failure is generally unknown, which makes repairing the failed AP remotely infeasible. To address this scenario, engineers may be assigned to find the failed AP in the network. This can be a cumbersome endeavor due to the large deployment range and the large number of APs. As such, maintenance of APs in a broad deployment may be very time-consuming and troublesome. Example implementations of the present disclosure provide systems and methods for autonomous AP failure recovery that address these technical problems associated with conventional AP deployments.

Figure 1:
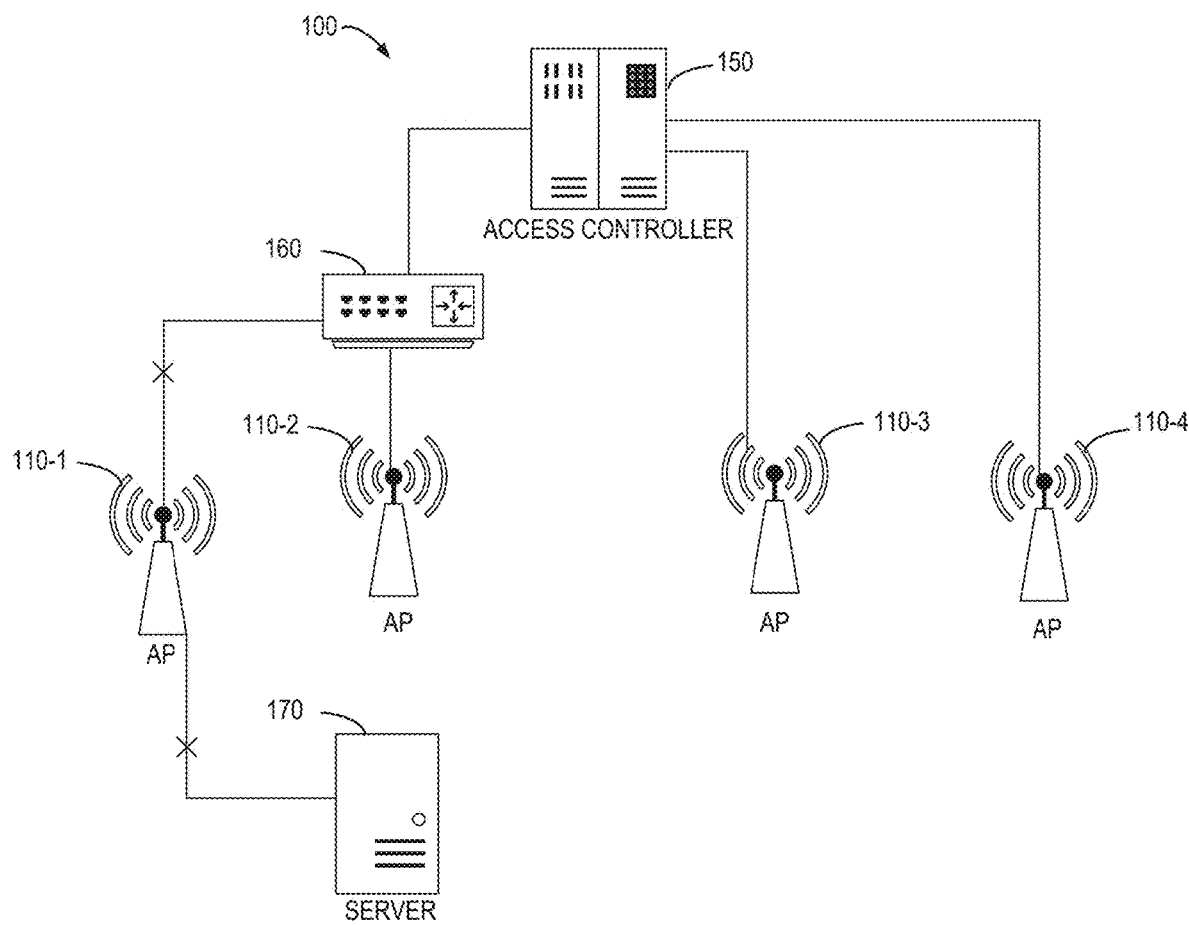
FIG. 1 illustrate a block diagram of an example communication environment in which example embodiments of the present disclosure can be implemented.

FIG. 1 illustrates an example communication environment 100 in which example embodiments of the present disclosure can be implemented. In the example environment 100, for the purpose of illustration, four APs 110-1, 110-2, 110-3, and 110-4 are depicted (referred to generically as AP 110 or APs 110). APs 110 are connected directly or via a router 160 to an access controller (AC) 150. APs 110 may be registered with the AC 150. With such arrangement, AP 110-1, AP 110-2, AP 110-3 and AP 110-4 may be considered as being within the same "neighborhood" and each AP 110 can be referred to as a neighbor AP of each other AP 110. In the environment 100, at least a subset of the APs 110 (e.g., AP 110-1 and AP 110-2) may be connected to a common router 160 and a common server 170.

It is to be understood that the number of APs, ACs and/or other devices depicted in FIG. 1 is only for the purpose of illustration without suggesting any limitations. The example environment 100 may include any suitable number of APS. ACs and/or other network devices, such as switches, gateways, and the like, configured for implementations of the present disclosure.

Communications between AP 110-1, AP 110-2, AP 110-3 and AP 110-4 may operate according to one or more wireless communication protocols such as Institute of Electrical and Electronic Engineers (IEEE) 802.11 standards, Wi-Fi Alliance Specifications, or any other suitable wireless communication standards. The IEEE 802.11 standards may include, for example, the IEEE 802.11ay standard (e.g., operating at 60 GHz), the IEEE 802.11ad standard (sometimes referred to as "WiGig"), or any other wireless communication standards.

In some cases, a failure may occur at an AP in the environment 100. For example, a failure may occur at the connection between AP 110-1 and the server 170, resulting in an interruption of one or more services provided by the server 170 at AP 110-1. As a consequence, AP 110-1 may not be able to communicate with AC 150 properly. In the case where the server 170 is a domain name system (DNS) server, a Dynamic Host Configuration Protocol (DHCP) server, or the like, the failure may be a DNS resolution failure and a failure to obtain IP address.

Various example implementations of the present disclosure propose an autonomous failure recovery protocol that enables a failed AP to automatically recover from failure with the assistance of another AP. Specifically, if an AP detects that a failure has occurred and finds that it can still communicate with another AP, e.g., a neighbor AP, the failed AP transmits a query to a neighbor AP about its operating status. If a response received from the neighbor AP indicates a normal operating status for the neighbor AP, then the failed AP may determine that the failure is not indicative of an event also impacting the neighbor AP. In this case, the failed AP can utilize the neighbor AP to assist with recovery from the failure in an autonomous manner that does not require manual intervention. By avoiding the time-consuming manual maintenance, a failed AP is able to quickly recover from failure so that service can be restored without delay.

Some example implementations of the present disclosure will be discussed in detail below with reference to other figures.

Figure 2:
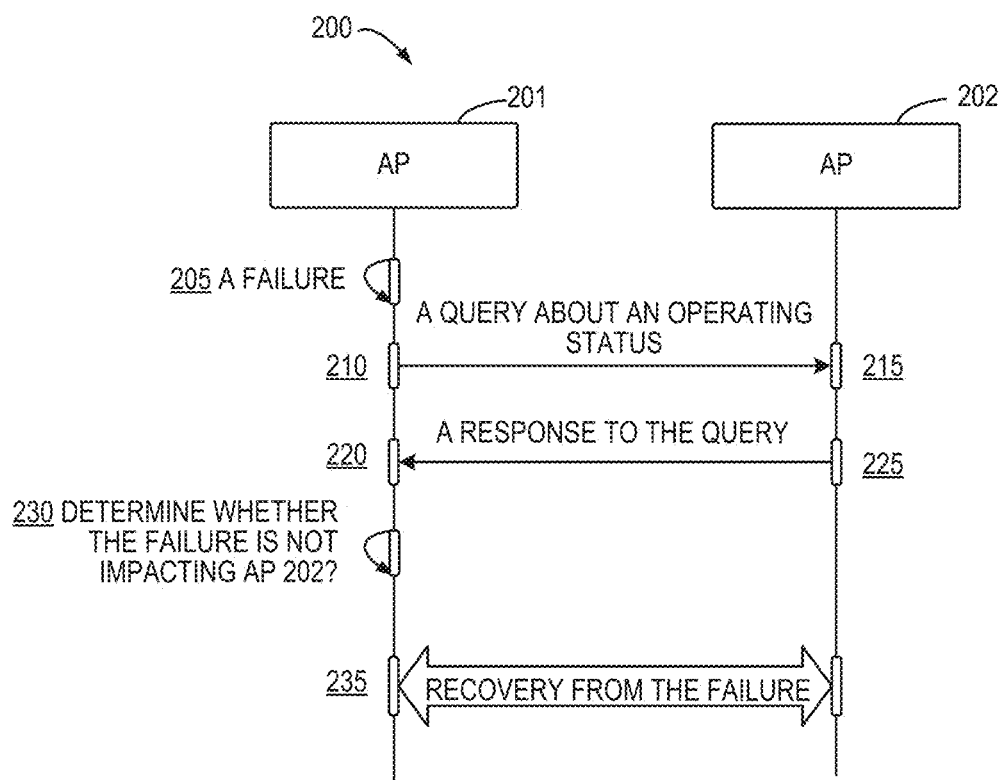
FIG. 2 illustrates a signaling flow for access point failure recovery in accordance with some example implementations of the present disclosure.

FIG. 2 illustrates a signaling flow 200 for AP failure recovery in accordance with some example implementations of the present disclosure. The signaling flow 200 involves AP 201 and AP 202, where AP 201 has experienced a failure, and AP 202 is an AP from which AP 201 tries to obtain assistance. For example, AP 201 may correspond to AP 110-1 in the example of FIG. 1, while AP 202 may correspond to one of AP 110-2, AP 110-3 or AP 110-4 as illustrated in FIG. 1 or another neighbor AP of AP 110-1. In accordance with implementations of the present disclosure, the AP 201 utilizes AP 202 to recover from a failure.

In the signaling flow 200, the AP 201 detects 205 a failure at the AP 201. In some example implementations, the failure may include a time synchronization failure, a domain name system (DNS) resolution failure, or the like. In some example implementations, the AP 201 may detect the failure through a boot-up process. During the boot-up process for an AP, a fixed sequence of boot-up operations may be successively performed. To better illustrate some example implementations of failure detection, an example boot-up process 300 for an AP is illustrated in FIG. 3.

Figure 3:
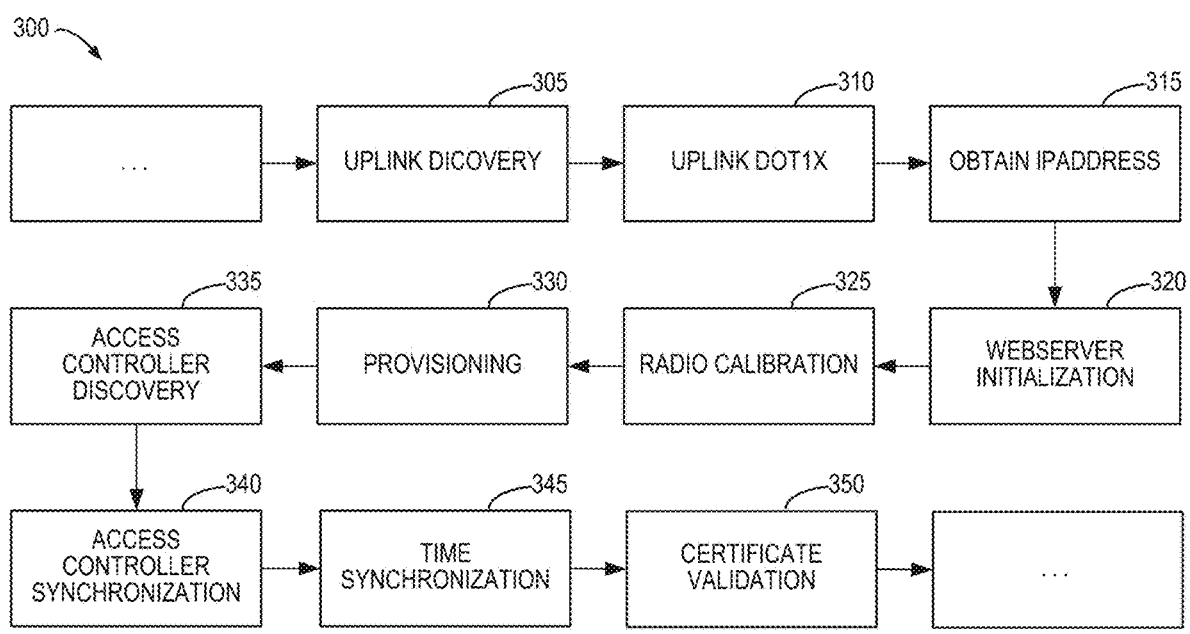
FIG. 3 illustrates a block diagram of an example boot up process of an access point.

As illustrated in FIG. 3, after the AP is powered up, it may perform the following sequence of operations: uplink discovery 305, uplink dot1x validation 310, obtaining 315 an IP address from a Dynamic Host Configuration Protocol (DHCP) server, webserver initialization 320, radio calibration 325, and provisioning 330. After the provisioning 330 is successfully performed, the AP is ready. Then, the AP may perform access controller discovery 335, access controller synchronization 340, time synchronization 345, certificate validation 350 and other function-related boot-up steps.

It is to be understood that the boot-up steps as illustrated are only for the purpose of illustration without suggesting any limitations. The boot-up process may comprise other boot-up operations and the sequence of the operations may vary from AP to AP. Further, two or more operations may be performed at least partially concurrently.

In some example implementations, if a failure event occurs during a particular operation, the boot-up process of AP 201 may be interrupted. In such an example scenario, the AP 201 may detect the failure and determine the type of the failure based on the particular operation during which the boot-up process is interrupted. For example, if the boot-up process is interrupted during provisioning, AP 201 may detect a provisioning failure.

In some example implementations, AP 201 may detect a failure when a failure event occurs during the operation. In some cases, when a failure event occurs at the AP, the AP may reboot to try to recover from the failure. If the failure is not remedied and the same failure event occurs again during the reboot, AP 201 then can determine that the failure has occurred based on the interruption of the reboot.

Referring back to FIG. 2, assuming that a failure is detected, AP 201 transmits 210 a query to AP 202 inquiring about an operating status of AP 202. For example, AP 202 may be a neighbor AP of AP 201. In some example implementations, AP 201 may select the neighbor AP from a neighbor AP list of AP 201. AP 201 may maintain the neighbor AP list, which may comprise at least one neighbor AP connected to a same AC (e.g., AC 150 in FIG. 1) to which AP 201 is connected.

In some example implementations, AP 201 may transmit a predefined query associated with a particular failure event. The predefined query may include a predetermined event code. An example correspondence table of event codes for failure events and the corresponding queries is illustrated below.

TABLE 1 correspondence table

| Event Code | Query |
|---|---|
| 0x0001 | gateway reachable? |
| 0x0002 | access controller reachable? |
| 0x0003 | NTP server reachable? |
| 0x0004 | RADIUS server reachable? |
| 0x0005 | get provisioned? |
| . . . | . . . |

As illustrated in Table 1, certain types of failure events may be associated with predefined event codes. For example, event code 0x0001 may indicate a failure to reach the gateway. In this situation, AP 201 may transmit a query including the corresponding event code to AP 202, to inquire about the gateway reachability of AP 202.

It is to be understood that the example event codes and corresponding queries illustrated in Table 1 are provided only for the purpose of illustration without suggesting any limitations. A correspondence table may comprise less, more or other failure event codes and corresponding queries.

In the signaling flow 200, AP 202 receives 215 the query about its operating status and transmits 225 a response to AP 201. The response indicates the operating status of AP 202. AP 202 may determine whether it has experienced a failure in a similar manner as AP 201. As such, the operating status specified in the response may indicate that AP 202 is operating normally or that a particular failure has been detected at AP 202. For example, AP 202 may receive a query about its gateway reachability. In response to the query, AP 202 may transmit a response to AP 201 indicating whether AP 202 is currently able to reach the gateway.

AP 201 receives 220 the response to the query from AP 202 and determines 230, based at least in part on the operating status of AP 202, whether the failure it has experienced is indicative of a more widespread failure event that is also impacting AP 202. In some implementations, if the operating status of AP 202 indicates no failure has occurred at AP 202, AP 201 determines that the failure detected at AP 201 is not a common failure in the network since it is not also impacting AP 202.

In accordance with a determination that the failure is not impacting AP 202, AP 201 utilizes 235 AP 202 to assist with recovery from the failure. Depending on the type of the failure, AP 201 may acquire different types of assistance from AP 202 to achieve the failure recovery. With the assistance from AP 202, it is possible for AP 201 to automatically recover from the failure, without manual involvement. This is more beneficial in a network with a dense deployment of APs where mutual assistance between APs can facilitate failure recovery.

To better illustrate the utilization of a neighbor AP to facilitate a failure recovery process for a failed AP, some example implementations will be discussed below with reference to FIGS. 4-6.

Figure 4:
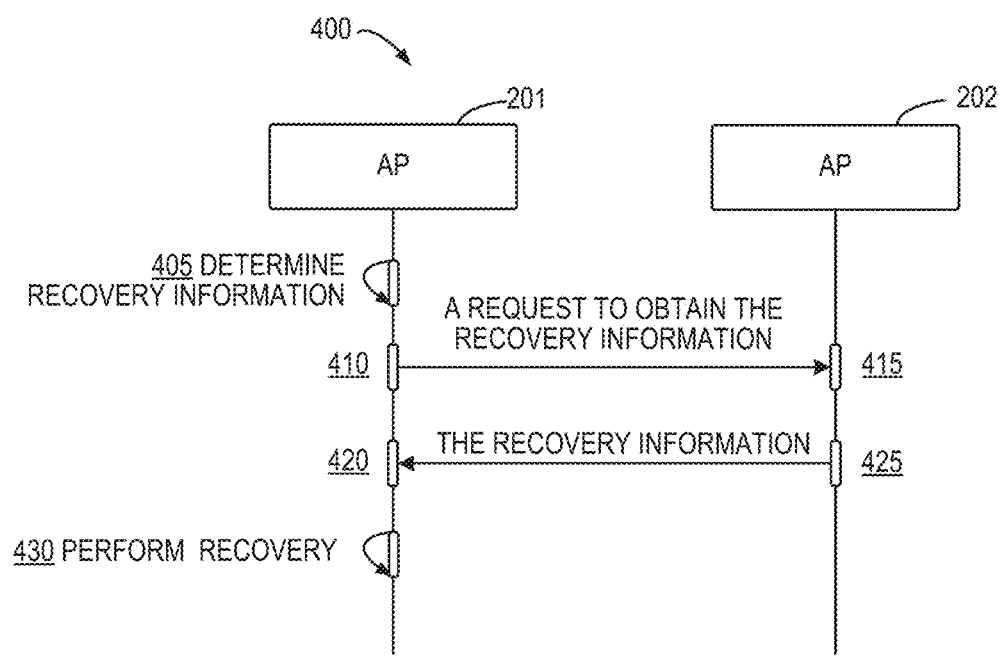
FIG. 4 illustrates a signaling flow for failure recovery in accordance with some example implementations of the present disclosure.

FIG. 4 illustrates a signaling flow 400 for recovery failure in accordance with some example implementations of the present disclosure. The signaling flow 400 may be considered as an example implementation of failure recovery with the assistance of AP 202 in the signaling flow 200.

In the signaling flow 400, the AP 201 determines 405 recovery information for recovering from the failure. The AP 201 may determine the recovery information needed to recover from the failure based on a type of the failure. More specifically, different types of failure may require different information to perform the recovery procedure.

In some example implementations, examples of failures may comprise a DNS resolution failure, a failure to obtain an IP address, a time synchronization failure, a certificate verification failure, a provisioning failure, and/or the like. In some example implementations, if AP 201 detects a DNS resolution failure, AP 201 may determine that DNS resolution information may be needed to perform the failure recovery. In some example implementations, if AP 201 detects that it fails to obtain an IP address, it may determine IP address information may be needed as the recovery information. In some example implementations, AP 201 may find that time is out of synchronization and thus that a time synchronization failure has occurred. In this case, AP 201 may need time reference information as the recovery information. In some example implementations, if the failure is a certificate verification failure, AP 201 may determine that a validated certificate is the recovery information to be used in the recovery. In some example implementations, if the failure comprises a provisioning failure, AP 201 may determine that provisioning information is needed as the recovery information.

In the signaling flow 400, AP 201 transmits 410, to AP 202, a request to obtain the recovery information. In some example implementations, AP 201 may communicate with AP 202 in a wireless manner. In some example implementations, AP 201 may determine a size of the recovery information. If the size of the recovery information is below a threshold size, AP 201 transmits the request to obtain the recovery information in a probe request to AP 202, and in this case the recovery information is received in a probe response to the probe request. For example, if the recovery information comprises DNS information which may be needed only once, AP 201 transmits the request in a probe request.

Correspondingly, if the size of the recovery information exceeds the threshold size, a wireless link may be established between AP 201 and AP 202. Then AP 201 transmits the request to AP 202 via the wireless link, and in this case the recovery information is received via the wireless link. For example, if the recovery information comprises a Remote Authentication Dial-In User Service (RADIUS) message which may be needed for a long period of time, a wireless link may be established.

AP 202 receives 415 the request from AP 201 and transmits 425 the recovery information to AP 201. AP 201 receives 420 the recovery information from AP 202. In some example implementations, the recovery information may be information currently running on AP 202. For example, if the recovery information comprises DNS resolution information, AP 202 may transmit the DNS resolution information cached in AP 202 to AP 201. If the recovery information comprises time reference information, AP 202 may transmit its own time information to AP 202. If the recovery information comprises provisioning information, AP 202 may transmit its provisioning information to AP 202.

AP 201 performs 430 the recovery from the failure based on the recovery information, for example, by means of applying the received recovery information to its configuration.

In the example implementation illustrated in FIG. 4, by using information running on AP 202 as recovery information, the response time by AP 202 is relatively short, which is advantageous for latency-sensitive applications. Typically, an AP and its neighbor AP are in the same internal network. They may thus share a plurality of types of common information. Therefore, the complexity of the recovery can be reduced by using information running on the neighbor AP.

Figure 5:
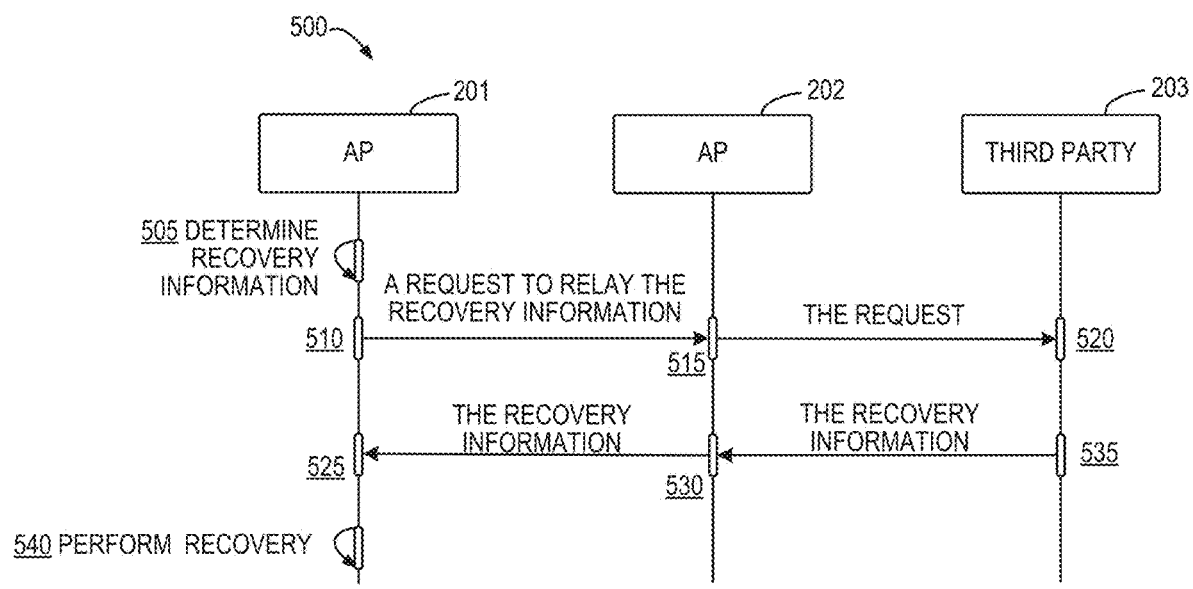
FIG. 5 illustrates a signaling flow for failure recovery in accordance with some further example implementations of the present disclosure.

FIG. 5 illustrates a signaling flow 500 for recovery from failure in accordance with some further example implementations of the present disclosure. The signaling flow 500 may be considered as an example implementation of failure recovery with the assistance of AP 202 in the signaling flow 200.

In the signaling flow 500, the AP 201 determines 505 recovery information for recovering from the failure. The AP 201 may determine the recovery information needed to recover from the failure based on a type of the failure. For example, the determination may be performed as discussed above with respect to FIG. 4. AP 201 transmits 510 a request to relay the recovery information from a third party 203 to AP 202. AP 202 forwards 515 the request to the third party 203. The third party 203 receives 520 the request and transmits 535 the recovery information to AP 202. AP 202 forwards 530 the recovery information to AP 201. AP 201 receives 525 the recovery information relayed by AP 202 from the third party 203. AP 201 performs 540 recovery from the failure based on the recovery information.

The third party 203 may be any entity other than AP 201 and AP 203, which is capable of providing the recovery information. In some examples, the third party 203 may be the AC, e.g., the AC 150 in the example of FIG. 1. In some examples, the third party 203 may be a server, which may be a physical entity or virtual entity for providing corresponding services deployed in the network. For example, the third party 203 may be a DNS server, a DHCP server, a Network time protocol (NTP) server, a RADIUS server, or the like.

In some example implementations, the third party 203 may be selected by AP 201. In other example implementations, the third party 203 may be selected by AP 202 according to the received request. For example, if the recovery information comprises DNS resolution information, a DNS server may be selected as the third party 203. In this scenario, AP 202 may forward the request to obtain the DNS resolution information to a DNS server and relay the response from the DNS server to AP 201. If the recovery information comprises time reference information, a local time service server or a public time service server, such as NTP server, may be selected as the third party 203. AP 202 may forward the request to the local time server or the public time service server according to a predefined rule. If recovery information comprises configuration or provisioning information, the AC 150 may be selected as the third party 203.

In some example implementations, the request may be forwarded to AC 150 first and AC 150 may determine whether to provide the recovery information itself or relay the request to another third party 203. In some example implementations, if the recovery information comprises security related information, the access controller 150 may be determined as the third party and AP 201 may transmit the request to relay the recovery information from the AC 150. For example, if the recovery information comprises a validated certificate, the request to obtain a validated certificate may be forwarded to the AC 150. Then, the AC 150 may verify AP 201 and determine whether to issue a validated certificate to AP 201. By forwarding the request to the AC 150, a high security level can be achieved.

In the illustrated example implementation, AP 202 as a neighbor AP may be viewed as an application proxy to provide necessary information associated with the application to failed AP 201. In this manner, various types of information can be provided to the failed AP to enable the failed AP to efficiently recover from the failure.

It should be appreciated that there may be a plurality of entities that can provide the recovery information related to one failure, such as an access controller, servers, other neighbor APs, or the like. The selection of the entity may depend on a predefined configuration in pursuit of a desired performance, such as low latency or high accuracy.

Figure 6:
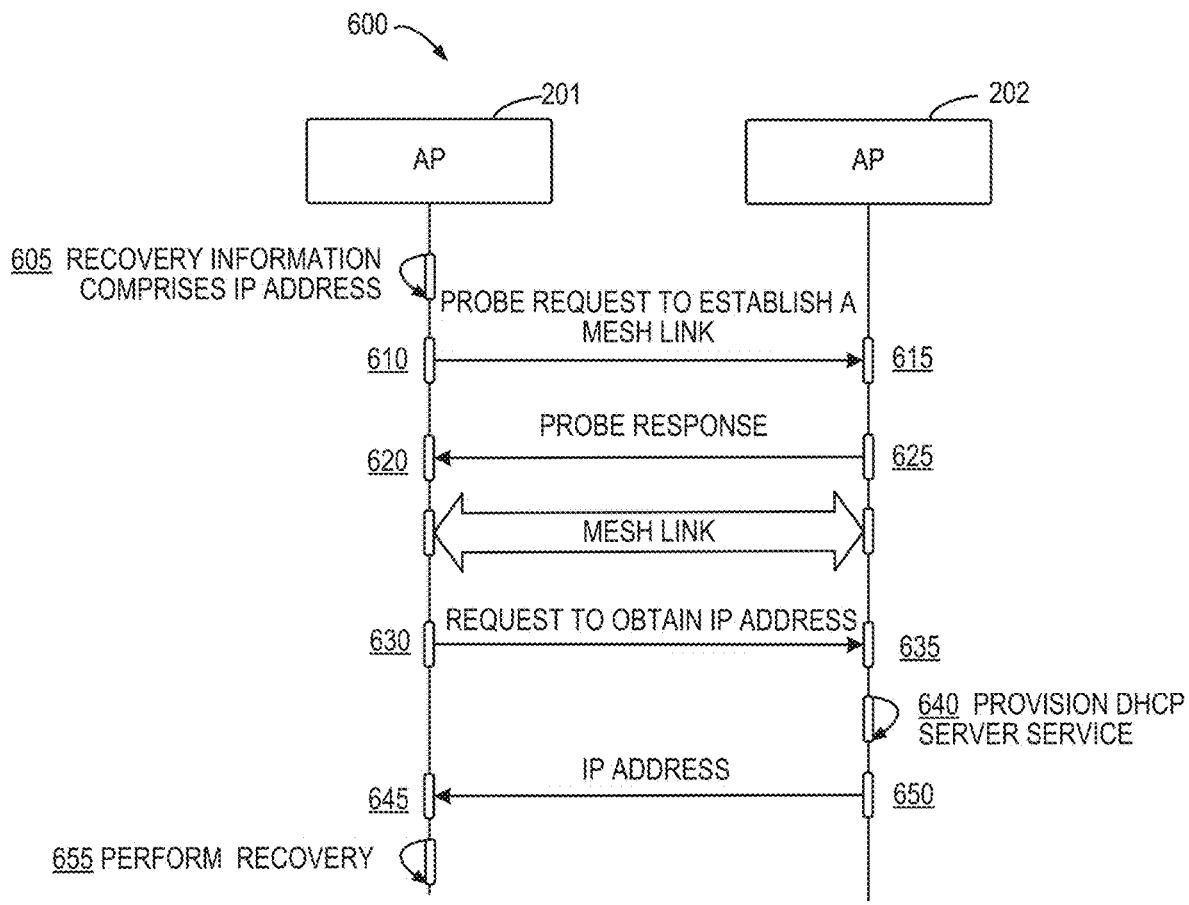
FIG. 6 illustrates a signaling flow for failure recovery in accordance with some yet further example implementations of the present disclosure.

FIG. 6 illustrates a signaling flow 600 for failure recovery in accordance with some yet further example implementations of the present disclosure. The signaling flow 600 may be considered as an example implementation of failure recovery with the assistance of AP 202 in the signaling flow 200.

In the signaling flow 600, AP 201 determines 605 that the recovery information comprises IP address information. For example, AP 201 may have lost its IP address, resulting in layer 3 communication failures. It is noted that layer 3 is the network layer in the seven-layer Open Systems Interconnection (OSI) model of computer networking and is responsible for packet forwarding including routing through intermediate routers.

AP 201 transmits a probe request to establish a mesh link to the second AP. In some example implementations, since layer 3 communication has failed, AP 201 may create a first virtual access point (VAP) in layer 2. It should be noted that the term "layer 2" described herein is also referred to as data link layer. It is the second layer of the seven-layer OSI model of computer networking. Layer 2 is the protocol layer that transfers data between nodes on a network segment across the physical layer.

In some example implementations, AP 201 may increase its transmission power and transmit the probe request via the first VAP. The probe request may indicate a layer 3 failure at AP 201.

AP 201 receives 620 a probe response to establish the mesh link from AP 202 and the mesh link is established. AP 202 receives 615 the probe request and transmits 625 a probe response. In some example implementations, when AP 202 receives the probe request, AP 202 may create a second VAP in layer 2 and the mesh link is established between the first VAP and the second VAP.

AP 201 transmits 630 a request to obtain IP address information via the mesh link to AP 202. When AP 202 receives 635 the request, AP 202 provisions 640 or deploys a DHCP server service, which, for example, may also be in layer 2. Although the DHCP server service is deployed after receiving the request as illustrated, the DHCP server service may also be previously provisioned. Then AP 202 transmits 650 the IP address information to AP 201.

AP 201 receives 645 the IP address information obtained from the DHCP server service. AP 201 performs 655 recovery based on the received IP address information.

In the example implementation as illustrated in FIG. 6, by establishing a mesh link, the failed AP can work around layer 3 and obtain an IP address from a neighbor AP where a DHCP server service has been deployed, thereby enabling the failed AP to recover from a IP failure with the assistance of a neighbor AP.

In some example implementations, when an AP detects an uplink failure or an unstable uplink which may not be detected by an access controller, the failed AP may mesh with a neighbor AP to re-establish an uplink.

Figure 7:
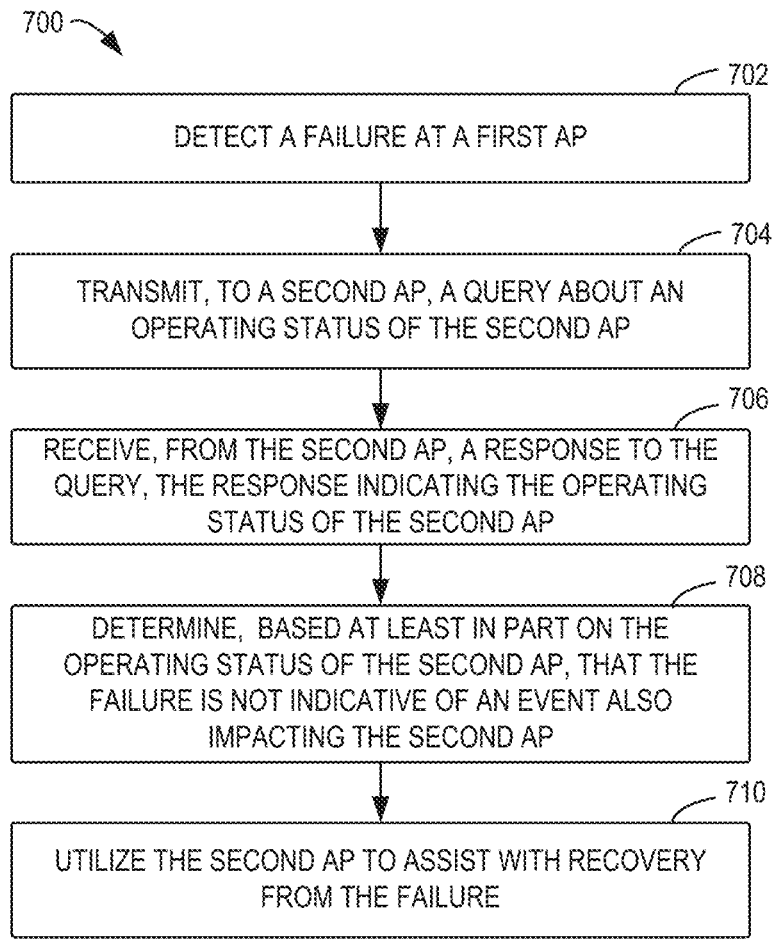
FIG. 7 illustrates a flowchart of a method in accordance with some example implementations.

FIG. 7 illustrates a flowchart of a method 700 in accordance with some example implementations of the present disclosure. The method 700 can be carried out by AP 201 according to the implementations described herein. While only some blocks are shown in the method 700, the method 700 may comprise other operations described herein. For convenience of discussion of the method 700, failed AP 201 implementing the method 700 is referred to as a first AP, and neighbor AP 202 is referred to as a second AP.

At 702, the first AP detects a failure at the first AP. At 704, the first AP transmits, to a second AP, a query about an operating status of the second AP. In some example implementations, the first AP selects the second AP from a neighbor AP list of the first AP—the neighbor AP list comprising at least one neighbor AP connecting to a same access controller to which the first AP is connected—and the first AP transmits the query to the selected second AP.

At 706, the first AP receives, from the second AP, a response to the query, the response indicating an operating status of the second AP.

At 708, the first AP determines, and based at least in part on the operating status of the second AP, that the failure is not indicative of an event also impacting the second AP. In some example implementations, in accordance with a determination that the operating status indicates no failure at the second AP, the first AP determines that the failure is not indicative of an event also impacting the second AP.

At 710, the first AP utilizes the second AP to assist with recovery from the failure. In some example implementations, the first AP determines recovery information for use in the recovery from the failure based on a type of the failure. Then, the first AP transmits, to the second AP, a request to obtain the recovery information. Upon receiving the recovery information from the second AP, the first AP performs the recovery from the failure based on the recovery information.

In some example implementations, in determining the recovery information, in accordance with a determination that the type of the failure comprises a domain name system (DNS) resolution failure, the first AP determines that DNS resolution information is the recovery information. In accordance with a determination that the failure comprises a failure to obtain an IP address of the first AP, the first AP may determine that IP address information is the recovery information. In accordance with a determination that the failure comprises a time synchronization failure, the first AP may determine that time reference information is the recovery information, in accordance with a determination that the failure comprises a certificate verification failure, the first AP may determine that a validated certificate is the recovery information. In accordance with a determination that the failure comprises a provisioning failure, the first AP may determine that provisioning information is the recovery information.

In some example implementations, transmitting the request to obtain the recovery information may include the first AP transmitting, to the second AP, a request to relay the recovery information from a third party. In some example implementations, receiving the recovery information from the second AP may include the first AP receiving the recovery information relayed by the second AP from the third party.

In some example implementations, transmitting the request to relay the recovery information from the third party may include—in accordance with a determination that the recovery information comprises security related information—the first AP transmitting the request to relay the recovery information from an access controller.

In some example implementations, the first AP may determine a size of the recovery information. In accordance with a determination that the size of the recovery information is below a threshold size, the first AP may transmit the request to obtain the recovery information in a probe request to the second AP. In this case, the recovery information is received in a probe response to the probe request.

In some example implementations, if the first AP determines that the size of the recovery information exceeds the threshold size, the first AP may establish a wireless link between the first AP and the second AP. The first AP may transmit the request to the second AP via the wireless link. In this case, the recovery information is received via the wireless link.

In some example implementations, if the first AP determines that the recovery information comprises IP address information, it may transmit a probe request to the second AP to establish a mesh link with the second AP. Upon receiving a probe response from the second AP to establish the mesh link, the first AP may transmit, to the second AP, a request to obtain IP address information via the mesh link established with the second AP.

In some example implementations, receiving the recovery information from the second AP may include the first AP receiving, via the mesh link, the IP address information from a DHCP server service deployed at the second AP.

Figure 8:
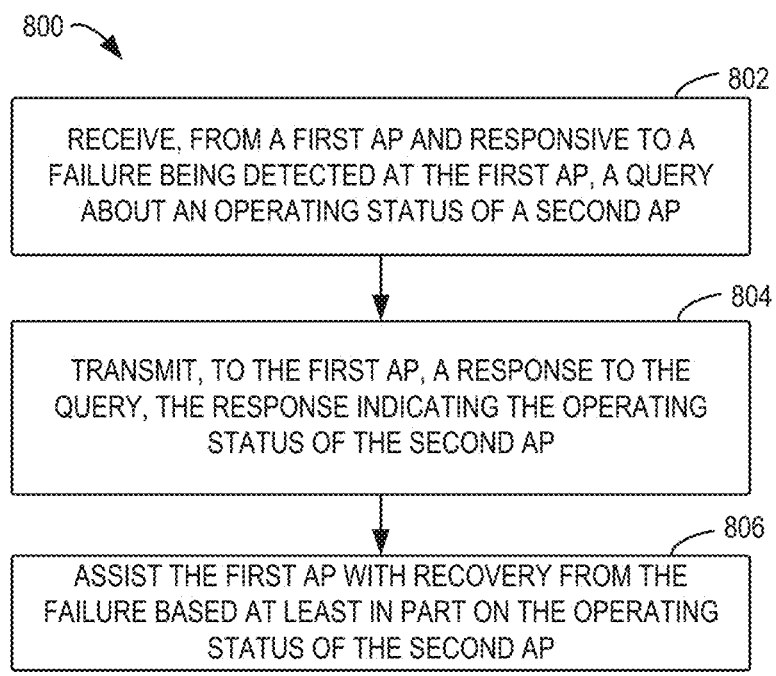
FIG. 8 illustrates a flowchart of a method in accordance with some further example implementations.

FIG. 8 illustrates a flowchart of a method 800 in accordance with some example implementations of the present disclosure. The method 800 can be carried out by AP 202 according to the implementations described herein. While only some blocks are shown in the method 800, the method 800 may comprise other operations described herein. For convenience of discussion of the method 800, the failed AP 201 implementing the method 800 is referred to as a first AP, and the neighbor AP 202 is referred to as a second AP.

At 802, the second AP receives, from a first AP and responsive to a failure being detected at the first AP, a query about an operating status of the second AP. In some example implementations, the second AP is a neighbor AP to the first AP and is identified in a neighbor AP list of the first AP.

At 804, the second AP transmits, to the first AP, a response to the query, the response indicating the operating status of the second AP.

At 806, the second AP assists the first AP with recovery from the failure based at least in part on the operating status of the second AP. In some example implementations, in accordance with a determination that the operating status indicates no failure at the second AP, the second AP assists the first AP with the recovery from the failure. In some example implementations, the second AP receives, from the first AP, a request to obtain recovery information for use in the recovery from the failure, and the second AP transmits the recovery information to the first AP.

In some example implementations, receiving the request to obtain the recovery information may include the second AP receiving, from the first AP, a request to relay the recovery information from a third party. The second AP may forward the request to the third party, and upon receiving the recovery information from the third party, the second AP may transmit the recovery information to the first AP.

In some example implementations, receiving the request to relay the recovery information from the third party may include the second AP receiving a request to relay the recovery information from an access controller. In this case, the recovery information comprises security related information.

In some example implementations, the recovery information comprises at least one of the following: DNS resolution information for use in recovery from a DNS resolution failure; time reference information for use in recovery from a time synchronization failure; a validated certificate for use in recovery from a certificate verification failure; provisioning information for use in recovery from a provisioning failure.

In some example implementations, the second AP receives the request to obtain the recovery information in a probe request. In this case, a size of the recovery information is below a threshold size; and the recovery information is transmitted in a probe response to the probe request.

In some example implementations, the second AP receives the request to obtain the recovery information via a wireless link between the first AP and the second AP. In this case, a size of the recovery information exceeds the threshold size and the recovery information is transmitted to the first AP via the wireless link.

In some example implementations, in receiving the request to obtain recovery information, and upon receiving a probe request to establish a mesh link, the second AP transmits a probe response to establish the mesh link with the first AP. In return, the second AP receives, from the first AP, a request to obtain IP address information via the mesh link.

In some example implementations, in transmitting the recovery information to the first AP, the second AP provisions a Dynamic Host Configuration Protocol (DHCP) server service at the second AP and the second AP transmits, via the mesh link, the IP address information obtained from the DHCP server service.

Figure 9:
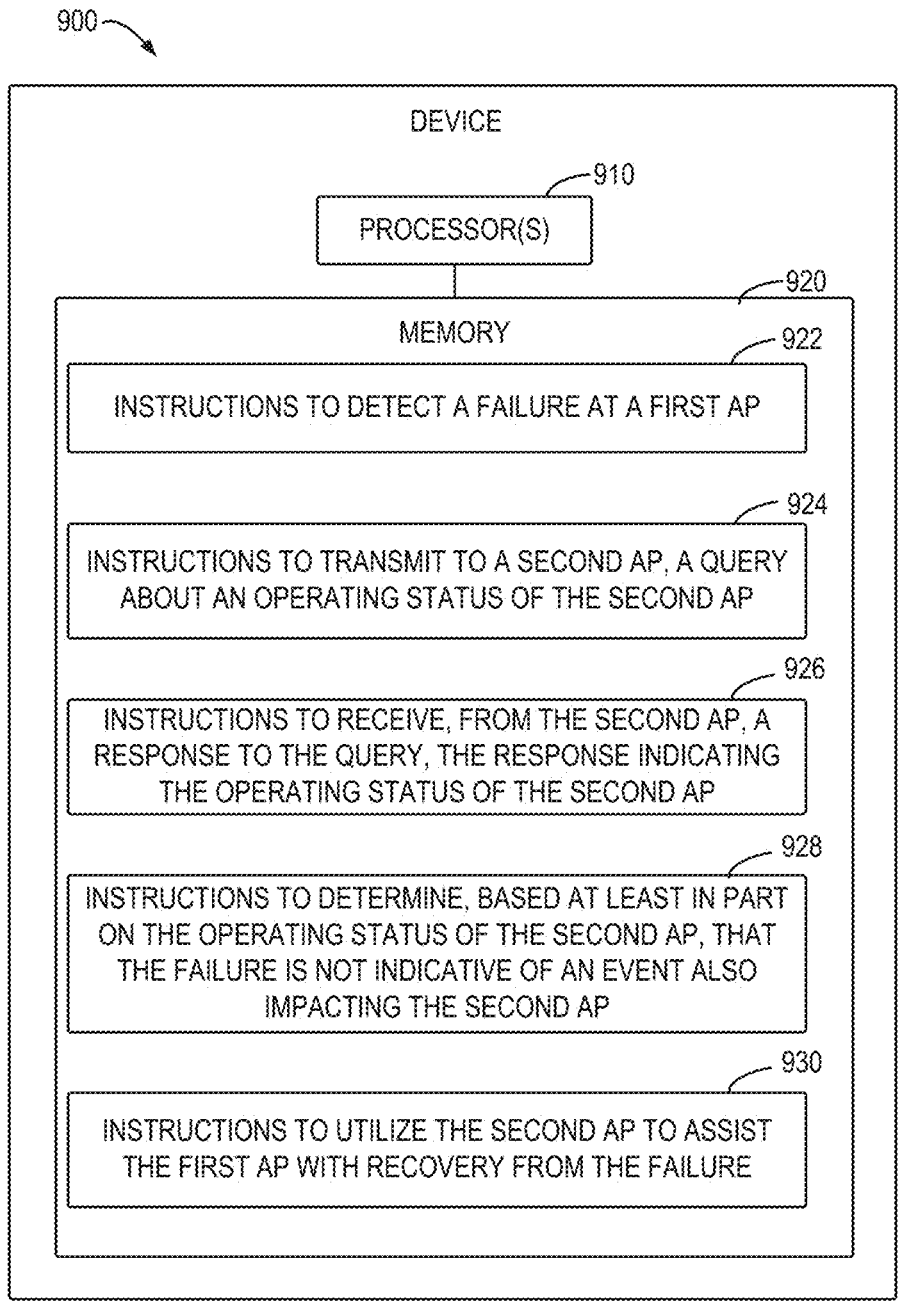
FIG. 9 illustrates a block diagram of an access point in accordance with some example implementations.

FIG. 9 illustrates a block diagram of an example device 900 in accordance with some example implementations of the present disclosure. The device 900, e.g. the AP 201, comprises at least one processor 910 and a memory 920 coupled to the at least one processor 910. The memory 920 stores instructions to cause the at least one processor 910 to implement acts of a method. For convenience of discussion, the device 900 is referred to as a first AP and a neighbor AP to the first AP is referred to as a second AP.

As illustrated in FIG. 9, the memory 920 stores instructions 922 to detect a failure at the first AP.

The memory 920 further stores instructions 924 to transmit, to a second AP, a query about an operating status of the second AP.

In some example implementations, the instructions 924 to transmit the query comprises instructions to select the second AP from a neighbor AP list of the first AP, the neighbor AP list comprising at least one neighbor AP connecting to a same access controller to which the first AP is connected; and transmit the query to the selected second AP.

The memory 920 further stores instructions 926 to receive, from the second AP, a response to the query, the response indicating the operating status of the second AP.

The memory 920 further stores instructions 928 to determine, based at least in part on the operating status of the second AP, that the failure at the first AP is not indicative of an event also impacting the second AP.

In some example implementations, instructions 928 to determine that the failure is not indicative of an event also impacting the second AP comprises instructions to, in accordance with a determination that the operating status indicates no failure at the second AP, determine that the failure is not indicative of an event also impacting the second AP.

The memory 920 further stores instructions 930 to utilize the second AP to assist with recovery from the failure at the first AP.

In some example implementations, the instructions 930 to utilize the second AP to assist with recovery from the failure comprise instructions to, determine, based on a type of the failure, recovery information for use in the recovery from the failure; transmit, to the second AP, a request to obtain the recovery information; receive the recovery information from the second AP; and perform the recovery from the failure based on the recovery information.

In some example implementations, the instructions to transmit the request to obtain the recovery information comprise instructions to transmit, to the second AP, a request to relay the recovery information from a third party; and the instructions to receive the recovery information from the second AP comprises instructions to receive the recovery information relayed by the second AP from the third party.

In some example implementations, the instructions to transmit the request to relay the recovery information from the third party comprise instructions to, in accordance with a determination that the recovery information comprises security related information, transmit the request to relay the recovery information from an access controller.

In some example implementations, the instructions to determine the recovery information comprise instructions to, in accordance with a determination that the type of the failure comprises a domain name system (DNS) resolution failure, determine DNS resolution information as the recovery information; in accordance with a determination that the failure comprises a failure to obtain an IP address of the AP, determine IP address information as the recovery information; in accordance with a determination that the failure comprises a time synchronization failure, determine time reference information as the recovery information; in accordance with a determination that the failure comprises a certificate verification failure, determine a validated certificate as the recovery information; in accordance with a determination that the failure comprises provisioning failure, determine provisioning information as the recovery information.

In some example implementations, the instructions to transmit the request to obtain the recovery information comprise instructions to, determine a size of the recovery information; and in accordance with a determination that the size of the recovery information is below a threshold size, transmit the request to obtain the recovery information in a probe request to the further AP. In this case the recovery information is received in a probe response to the probe request.

In some example implementations, the instructions to transmit the request to obtain the recovery information further comprise instructions to, in accordance with a determination that the size of the recovery information exceeds the threshold size, establish a wireless link between the first AP and the second AP; and transmit the request to the further AP via the wireless link. In this case the recovery information is received via the wireless link.

In some example implementations, the instructions to transmit a request to obtain the recovery information comprise instructions to, in accordance with a determination that the recovery information comprises IP address information, transmit a probe request to establish a mesh link to the second AP; receive a probe response to establish the mesh link from the second AP; and transmit a request to obtain IP address information via the mesh link to the second AP.

In some example implementations, the instructions to receive the recovery information from the further AP comprise instructions to, receive, via the mesh link, the IP address information from a DHCP server service provisioned at the second AP.

Figure 10:
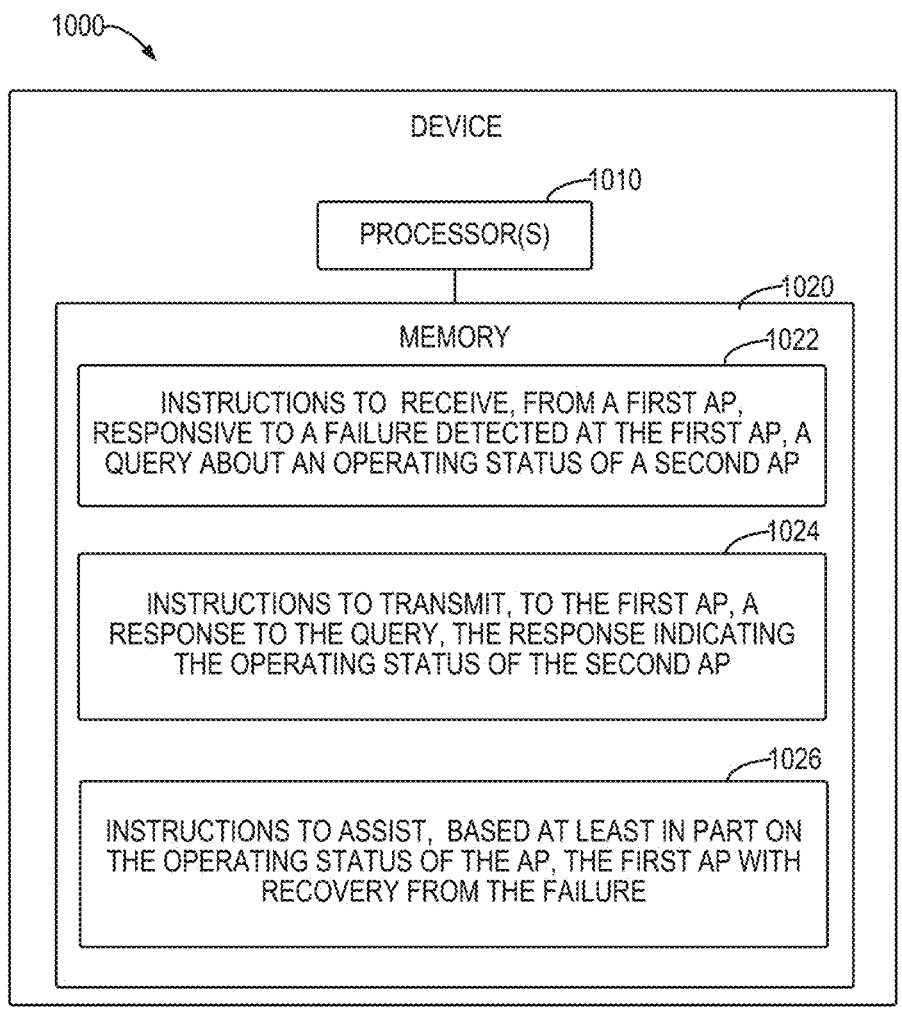
FIG. 10 illustrates a block diagram of an access point in accordance with some further example implementations.

FIG. 10 illustrates a block diagram of an example device 1000 in accordance with some example implementations of the present disclosure. The device 1000, e.g. AP 202, comprises at least one processor 1010 and a memory 1020 coupled to the at least one processor 1010. The memory 1020 stores instructions to cause the at least one processor 1010 to implement acts of a method. The device 1000 may be a second AP, which may be a neighbor AP for a first AP.

As illustrated in FIG. 10, the memory 1020 stores instructions 1022 to receive, from a first AP and responsive to a failure being detected at the first AP, a query about an operating status of a second AP. In some example implementations, the second AP is comprised in a neighbor AP list of the first AP.

The memory 1020 further stores instructions 1024 to transmit, to the first AP, a response to the query, the response indicating the operating status of the second AP; and The memory 1020 further stores instructions 1026 to assist, the first AP with recovery from the failure based at least in part on the operating status of the AP.

In some example implementations, the instructions 1026 to assist the first AP with the recovery from the failure comprises instructions to, in accordance with a determination that the operating status indicates no failure at the AP, assist the first AP with the recovery from the failure.

In some example implementations, the instructions to assist 1026 the first AP with recovery from the failure comprise instructions to, receive, from the first AP, a request to obtain recovery information for use in recovery from the failure; and transmit the recovery information to the first AP.

In some example implementations, the instructions to receive the request to obtain the recovery information comprise instructions to, receive, from the first AP, a request to relay the recovery information from a third party; and the instructions to transmit the recovery information comprise instructions to forward the request to the third party; receive the recovery information from the third party; and transmit the recovery information to the first AP.

In some example implementations, the instructions to receive the request to relay the recovery information from the third party comprise instructions to receive the request to relay the recovery information from an access controller, the recovery information comprising security related information.

In some example implementations, the recovery information comprises at least one of the following: Domain Name System (DNS) resolution information for use in recovery from a DNS resolution failure; time reference information for use in recovery from a time synchronization failure; a validated certificate for use in recovery from a certificate verification failure; provisioning information for use in recovery from a provisioning failure.

In some example implementations, the instructions to receive the request to obtain the recovery information comprise instructions to receive the request to obtain the recovery information in a probe request when, for example, a size of the recovery information is below a threshold size. In this case, the recovery information is transmitted in a probe response to the probe request.

In some example implementations, the instructions to receive the request to obtain the recovery information comprise instructions to receive the request to obtain the recovery information via a wireless link between the first AP and the second AP when, for example, a size of the recovery information exceeds the threshold size. In this case, the recovery information is transmitted to the first AP via the wireless link.

In some example implementations, the instructions to receive the request to obtain recovery information comprise instructions to receive a probe request to establish a mesh link; transmit a probe response to establish the mesh link to the first AP; and receive, from the first AP, a request to obtain IP address information via the mesh link.

In some example implementations, the instructions to transmit the recovery information to the first AP comprise instructions to provision a DHCP server service at the second AP; and transmit, via the mesh link, the IP address information obtained from the DHCP server service.

The present disclosure also provides at least one computer program product tangibly stored on a non-transitory computer-readable storage medium. The computer program product includes program codes or instructions which can be executed to carry out the method as described above with reference to FIG. 7 or FIG. 8.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   detecting at failure at a first access point (AP);
   transmitting, by the first AP to a second AP, a query about an operating status of the second AP;
   receiving, by the first AP from the second AP, a response to the query, the response indicating the operating status of the second AP;
   determining, by the first AP and based at least in part on the operating status of the second AP, that the failure is not indicative of an event also impacting the second AP;
   utilizing, by the first AP, the second AP to assist the first AP with recovery from the failure by:
   determining, based on a type of the failure, recovery information for use in the recovery from the failure;
   transmitting, to the second AP, a request to obtain the recovery information;
   receiving the recovery information from the second AP; and
   performing the recovery from the failure based on the recovery information.

2. The method of claim 1, wherein transmitting the query comprises:
   selecting the second AP from a neighbor AP list of the first AP, the neighbor AP list comprising at least one neighbor AP connecting to a same access controller to which the first AP is connected; and
   transmitting the query to the selected second AP.

3. The method of claim 1, wherein determining that the failure is not indicative of an event also impacting the second AP comprises:
   determining that the operating status indicates no failure at the second AP.

4. The method of claim 1, wherein transmitting the request to obtain the recovery information comprises:
   transmitting, to the second AP, a request to relay the recovery information from a third party; and
   wherein receiving the recovery information from the second AP comprises:
   receiving the recovery information relayed by the second AP from the third party.

5. The method of claim 1, wherein determining the recovery information comprises:
   in accordance with a determination that the type of the failure comprises a domain name system (DNS) resolution failure, determining DNS resolution information as the recovery information;

in accordance with a determination that the failure comprises a failure to obtain an IP address of the first AP, determining IP address information as the recovery information;

in accordance with a determination that the failure comprises a time synchronization failure, determining time reference information as the recovery information;

in accordance with a determination that the failure comprises a certificate verification failure, determining a validated certificate as the recovery information; and in accordance with a determination that the failure comprises a provisioning failure, determining provisioning information as the recovery information.

6. The method of claim 1, wherein transmitting the request to obtain the recovery information comprises:

determining a size of the recovery information; and in accordance with a determination that the size of the recovery information is below a threshold size, transmitting the request to obtain the recovery information in a probe request to the second AP, and wherein the recovery information is received in a probe response to the probe request.

7. The method of claim 6, wherein transmitting the request to obtain the recovery information farther comprises:

in accordance with a determination that the size of the recovery information exceeds the threshold size, establishing a wireless link between the first AP and the second AP; and transmitting the request to the second AP via the wireless link, and wherein the recovery information is received via the wireless link.

8. The method of claim 5, wherein transmitting a request to obtain the recovery information comprises:

in accordance with a determination that the recovery information comprises IP address information, transmitting, by the first AP to the second AP, a probe request to establish a mesh link;

receiving, by the first AP from the second AP, a probe response to establish the mesh link; and transmitting, by the first AP to the second AP, a request to obtain IP address information via the mesh link.

9. The method of claim 8, wherein receiving the recovery information from the second AP comprises:

receiving, by the first AP via the mesh link, the IP address information from a Dynamic Host Configuration Protocol (DHCP) server service provisioned at the second AP.

10. A method comprising:

receiving, by a second access point (AP) from a first AP and responsive to a failure being detected at the first AP, a query about an operating status of the second AP;

transmitting, by the second AP to the first AP, a response to the query, the response indicating the operating status of the second AP;

assisting, by the second AP, the first AP with recovery from the failure based at least in part on the operating status of the second AP by:

receiving, from the first AP, a request to obtain recovery information for use in the recovery from the failure; and transmitting the recovery information to the first AP, wherein the recovery information comprises at least one of the following:

Domain Name System (DNS) resolution information for use in recovery from a DNS resolution failure:

time reference information for use in recovery from time synchronization failure;

a validated certificate for use in recovery from certificate verification failure;

provision information for use in recovery from provision failure; and

IP address information for use in recovery from failure to obtain an IP address of the first AP.

11. The method of claim 10, wherein the second AP is specified in a neighbor AP list of the first AP.

12. The method of claim 10, wherein assisting the first AP with the recovery from the failure comprises:

in accordance with a determination that the operating status indicates no failure at the second AP, assisting the first AP with the recovery from the failure.

13. The method of claim 10, wherein receiving the request to obtain the recovery information comprises:

receiving the request to obtain the recovery information in a probe request based at least in part on a size of the recovery information being below a threshold size; and wherein the recovery information is transmitted in a probe response to the probe request.

14. The method of claim 10, wherein receiving the request to obtain the recovery information comprises:

receiving the request to obtain the recovery information via a wireless link between the first AP and the second AP, a size of the recovery information exceeding the threshold size; and wherein the recovery information is transmitted to the first AP via the wireless link.

15. The method of claim 10, wherein receiving the request to obtain recovery information comprises:

receiving, from the first AP, a probe request to establish a mesh link;

transmitting a probe response to establish the mesh link to the first AP; and receiving, from the first AP, a request to obtain IP address information via the mesh link.

16. The method of claim 15, wherein transmitting the recovery information to the first AP comprises:

provisioning a Dynamic Host Configuration Protocol (DHCP) server service at the second AP; and transmitting, via the mesh link, the IP address information obtained from the DHCP server service.

* * * * *